(12) United States Patent
Vikramaditya et al.

(10) Patent No.: US 9,318,147 B1
(45) Date of Patent: Apr. 19, 2016

(54) READ READ-ONLY FIELDS WHILE WRITING

(71) Applicant: Seagate Technology LLC, Cupertino, CA (US)

(72) Inventors: Barmeshwar Vikramaditya, Eden Prairie, MN (US); Bruce Douglas Buch, Westborough, MA (US); Timothy Ellis, Tonka Bay, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/050,447

(22) Filed: Oct. 10, 2013

(51) Int. Cl.
*G11B 20/10* (2006.01)
*G11B 19/04* (2006.01)

(52) U.S. Cl.
CPC .......... *G11B 20/10046* (2013.01); *G11B 19/04* (2013.01)

(58) Field of Classification Search
None
See application file for complete search history.

(56) References Cited

U.S. PATENT DOCUMENTS

| 5,523,898 | A | 6/1996 | Jove | |
|---|---|---|---|---|
| 5,579,189 | A * | 11/1996 | Morehouse et al. | 360/256.4 |
| 6,583,946 | B1 | 6/2003 | Emerson | |
| 6,625,235 | B1 * | 9/2003 | Coker | G11B 20/10009 360/65 |
| 7,092,186 | B1 * | 8/2006 | Hogg | 360/60 |
| 7,133,233 | B1 | 11/2006 | Ray | |
| 7,702,991 | B2 * | 4/2010 | Haratsch | G11B 20/18 360/39 |
| 7,880,999 | B2 | 2/2011 | Benakli | |
| 8,213,103 | B2 | 7/2012 | Grobis | |
| 8,443,273 | B2 * | 5/2013 | Eleftheriou | G11B 20/10009 714/794 |
| 2011/0141610 | A1 * | 6/2011 | Grobis et al. | 360/75 |
| 2012/0050904 | A1 * | 3/2012 | Park | G11B 5/59694 360/31 |

* cited by examiner

*Primary Examiner* — Daniell L Negron
(74) *Attorney, Agent, or Firm* — Cesari and Reed, LLP; Kirk A. Cesari

(57) ABSTRACT

A circuit may be configured to reduce the amount of space used on a storage device when a transducer having a reader and writer passes from a writable data field to a read-only field by enabling both the reader and writer simultaneously. The circuit can be configured to reduce to a threshold level the noise on a read signal that can occur when the reader is over a read-only field and the writer is over a writable data field, and can ignore the read data when both the writer and reader are enabled simultaneously over a writable data field.

17 Claims, 8 Drawing Sheets

READ READ-ONLY FIELDS WHILE WRITING

SUMMARY

In certain embodiments, an apparatus may comprise a circuit configured to receive a read signal via a read element of a transducer when the read element enters a read-only field. The circuit may also be configured to provide a write signal to a write element of the transducer when the write element is over a writable data field and the read element is in the read-only field. Further, the circuit can be configured to enable a filter to filter the noise of the read signal received during the simultaneous operation of the read and write elements.

In certain embodiments, an apparatus may include a circuit configured to write data via a write element when the write element is over a writable data field and a read element is reading from a read-only field In certain embodiments, a method may comprise writing data via a write element when the write element is over a writable data field and a read element is reading from a read-only field.

DETAILED DESCRIPTION

In the following detailed description of the embodiments, reference is made to the accompanying drawings which form a part hereof, and in which are shown by way of illustrations. It is to be understood that features of the various described embodiments may be combined, other embodiments may be utilized, and structural changes may be made without departing from the scope of the present disclosure. It is also to be understood that features of the various embodiments and examples herein can be combined, exchanged, or removed without departing from the scope of the present disclosure.

The present disclosure generally relates to data storage systems, such as disc memory. Specifically, the present disclosure relates to reading read-only fields while writing data.

Disc storage systems can be comprised of a rotating disc, a recording head, servo motors, a spindle motor, and other electronics. The disc can be divided into sectors, including data sectors and read-only fields (such as servo sectors, interspersed timing fields, etc.). Information contained in the data sectors, which can include user data and system data, and read-only sectors, which can include data used by servo electronics to determine the spatial location of the disc, can be stored onto tracks on the disc.

As the disc rotates, the recording head, which may be a transducer, can pass over data and servo fields as the disc rotates beneath. When the recording head passes into or out of a data or read-only field, the status of the reader and writer elements in the head may change. For example, the reader may become enabled or disabled and the writer may become disabled or enabled.

In some systems, the reader and writer cannot be enabled concurrently, and as a result, there may be a gap on the disc between the data and servo fields where no information may be stored, and whose width can be the distance between the reader and writer elements on the recording head. Enabling the simultaneous operation of the reader and writer can substantially reduce or eliminate the gap.

Figure 1:
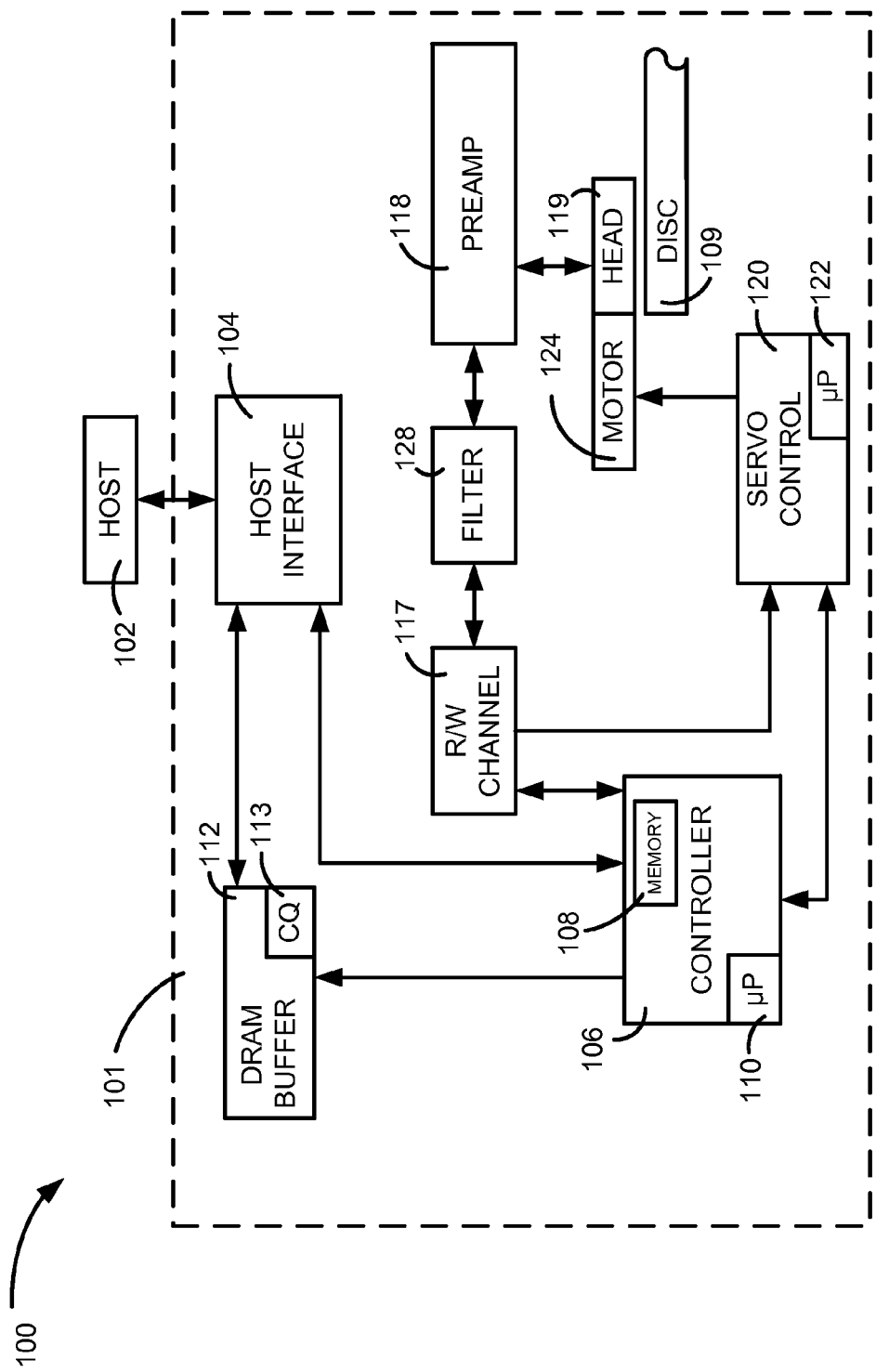
FIG. 1 is a diagram of reading read-only fields while writing, in accordance with certain embodiments of the present disclosure.

FIG. 1 depicts a system with reading read-only fields while writing, generally designated 100. Specifically, the system 100 provides a functional block diagram of a data storage device (DSD). The DSD 101 can optionally connect to be removable from a host device 102, which can be a desktop computer, a laptop computer, a server, a telephone, a music player, another electronic device, or any combination thereof. The data storage device 101 can communicate with the host device 102 via the hardware/firmware based host interface circuit 104 that may include a connector (not shown) that allows the DSD 101 to be physically removed from the host 102.

The DSD 101 can include a programmable controller 106 with associated memory 108 and processor 110. The programmable controller 106 may be part of a system on chip (SOC). A buffer 112 can temporarily store user data during read and write operations and can include a command queue (CQ) 113 where multiple access operations can be temporarily stored pending execution. Further, the DSD 101 can include a read/write (R/W) channel 117 which can encode data during write operations and reconstruct user data during read operations. A preamplifier/driver circuit (preamp) 118 can apply write currents to the head(s) 119 and can provide pre-amplification of readback signals, and a filter 128 may be placed between the preamp 118 and the R/W channel 117 to reduce the amount of write data noise coupled onto the readback signals. A servo control circuit 120 may use servo data from a servo sector to provide the appropriate current to the voice coil motor 124 or a microactuator to position the head(s) 119 over disc(s) 109. The controller 106 can communicate with a processor 122 to move the head(s) 119 to the desired locations on the disc(s) 109 during execution of various pending commands in the command queue 113 or during other operations. The channel configurations and systems described herein may be implemented in the R/W channel 117 as hardware circuits, software, memory, or any combination thereof.

The recording head can contain a magnetic reader and writer which may be located a certain distance apart on the recording head. When the disc rotates under the recording head, a particular physical location on disc may pass under the reader before the writer much like the front of a moving car passes a sign post before the back of the car.

The information in the servo field can be retrieved by the reader so it can be used by the servo electronics to determine where to move the recording head. During operations such as track seeking, the servo motors can move the head to different location on the disc so that read or write operations can be performed to the desired track(s).

A preamp may be located between the recording head and a channel. The preamp can provide the power to the writer to magnetize the tracks, and may also amplify or otherwise condition the data signal sent by the reader element in the head. In some embodiments, the preamp can control when the reader or writer in the recording head is enabled, while in other embodiments, this may be determined by another device such as a controller, channel, microprocessor, software, etc.

Figure 2:
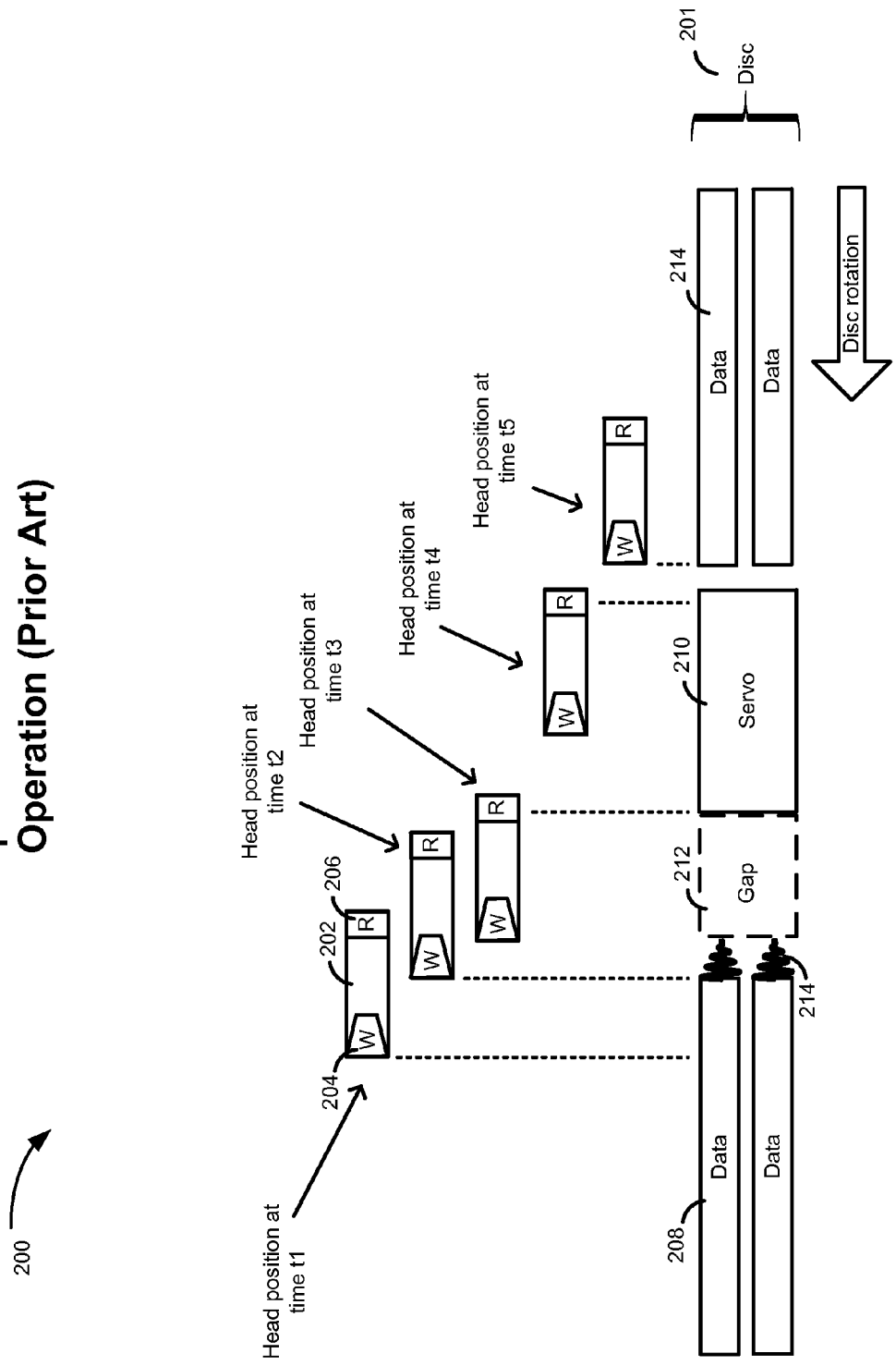
FIG. 2 is a diagram of reading read-only fields while writing, in accordance with certain embodiments of the present disclosure.

Referring to FIG. 2, a diagram of reading read-only fields while writing is shown and is generally designated 200. Specifically, the diagram 200 provides a spatial illustration of the prior art. The recording head 202 and its associated reader 206 and writer 204, is shown at five different moments in time (t1, t2, t3, t4, and t5). The disc 201 can contain a data field 208 located prior to a writer degauss 214, a gap 212, and data field 214 located after the servo field 210. A degauss 214 can be performed to decrease or eliminate the magnetic field on the writer element, and may occur when the writer 204 is disabled and no longer in the data field 208. In some embodiments, a degauss can be controlled by a preamp, although in other embodiments, it can be controlled by a channel, a controller, firmware, software, or other device.

At time t1, the disc 201 can rotate past the reader 206 so that the reader 206 may be located over the gap 212 while the writer 204 may still be over the data field 208. At time t2, the writer 204 can be disabled and degaussed 214. The writer 204 may be fully disabled and degaussed at t3 and the reader 206 may be entering the servo field 210; the width of the gap 212 may be as wide as the distance between the reader 206 and the writer 204 on the recording head 202. At time t4, the reader 206 may exit the servo field 210 and the writer 204 can remain disabled. The reader 206 may be disabled and the writer 204 enabled when the writer 204 enters the data field 214.

In some embodiments, when the reader 206 is entering the servo field 210, an Sgate may be asserted. Safety gates (Sgates) are locations on the disc 201 that can be used to protect a read-only area, such as a servo sector, from being overwritten. When Sgates are asserted, the writer can be disabled and a read channel can demodulate the modulated servo signal retrieved by the reader. When the reader 206 exits the servo field 210, the Sgate can be de-asserted.

Figure 3:
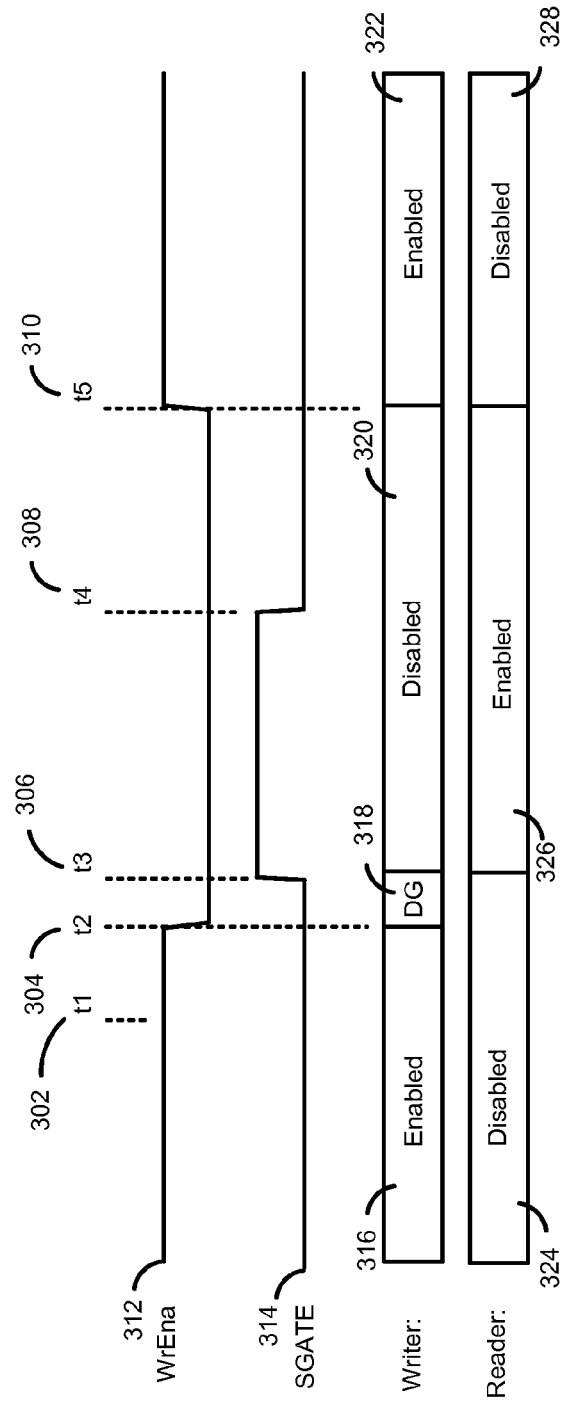
FIG. 3 is a diagram of reading read-only fields while writing, in accordance with certain embodiments of the present disclosure.

Referring to FIG. 3, a diagram of reading read-only fields while writing is shown and is generally designated 300. Specifically, the diagram 300 provides a timing diagram of the prior art. As with 200, the timing diagram 300 is marked by five different moments in time. Prior to time t1 302, the WrEna 312 is high (enable the writer), SGATE 314 is low (sgate not asserted), the writer enabled 316, and the reader disabled 324. At t1 302, the reader may no longer be spatially located over the data field (see time t1 in FIG. 2), but because the writer may still be over the data field, the reader remains disabled 324 and the writer remains enabled 316; the reader can remain disabled as the writer is degaussed 318. At time t2 304, the writer may have transitioned out from over the data field, and WrEna 312 may be set to a logic low (disable the writer), thus degaussing the writer 318 and enabling the reader 326. After the writer is degaussed 318 at time t3 306, the reader may transition into the servo field, which can result in an sgate assertion 314. At time t4 308, the sgate may be de-asserted, but the writer may not be over a data field and so may remain disabled 320. The writer may be spatially located over the data field at time t5 310, and so the writer may be enabled 322 and the reader disabled 328.

The gap on the disc between the data fields and the servo fields can be reduced or eliminated when the reader and writer are enabled simultaneously because the requirement that the reader remain disabled until the writer exits the data field and is disabled no longer applies. When the reader is over the servo field and the writer is over the data field, both sets of data may be valid and may not be discarded. Noise can interfere with the data, and a noise threshold can be determined such that interference will not affect the integrity of the data.

Figure 4:
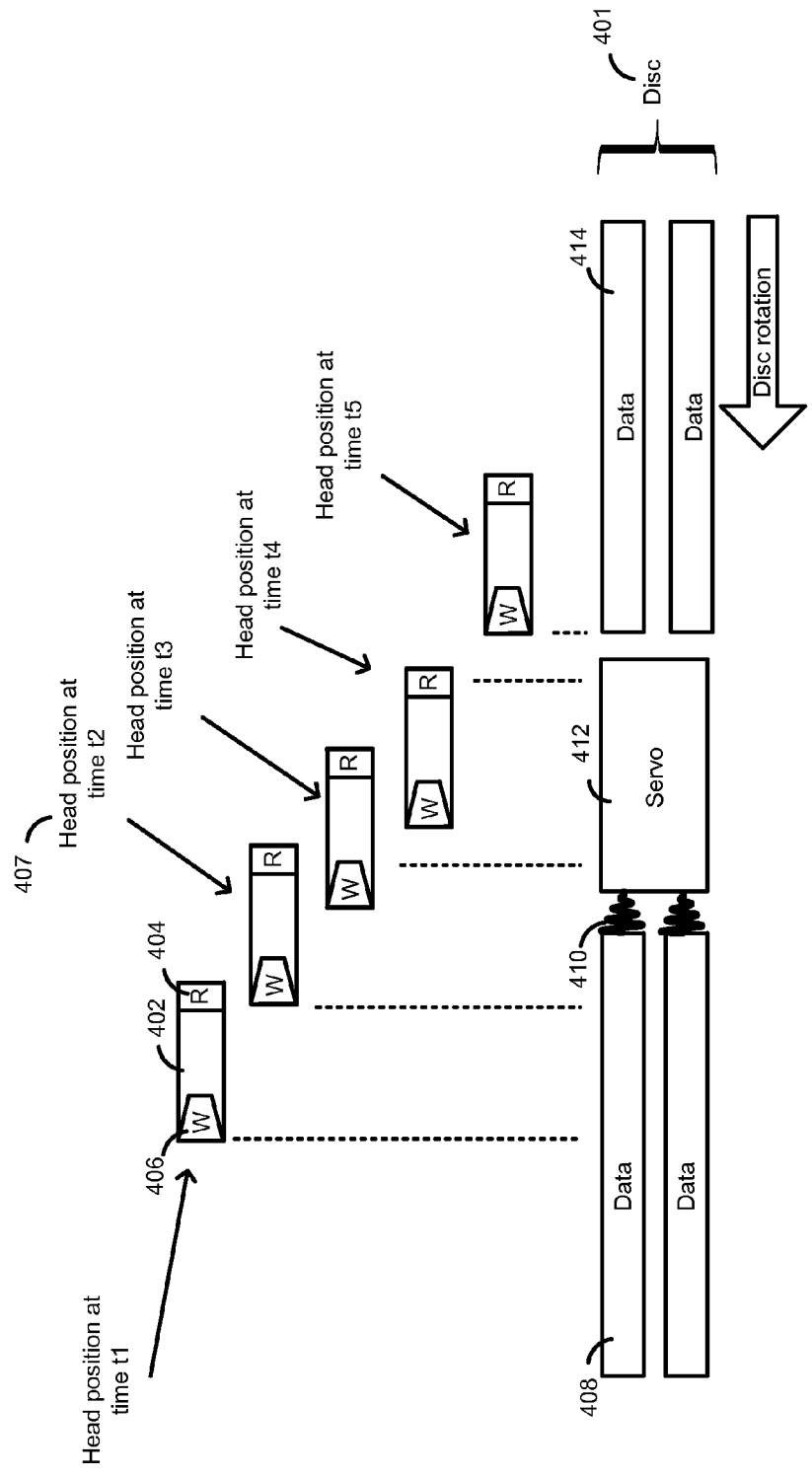
FIG. 4 is a diagram of reading read-only fields while writing, in accordance with certain embodiments of the present disclosure.

Referring to FIG. 4, a diagram of reading read-only fields while writing is shown and is generally designated 400. The diagram 400 shows a recording head 402, a reader 406, and a writer 404. Furthermore, a disc 401, a data field 408 located prior to a servo field 412, a data field 414 located after the servo field 412, and a writer degauss 410 are also shown.

The diagram 400 illustrates the progression of the rotating disc under the transducer at five different points in time in an embodiment where the reader and writer may be enabled simultaneously. At time t1, the reader 404 and writer 406 are over the data field and may both be enabled although the read data can be ignored. The disc can rotate until, at time t2 407, the reader 404 is enabled and over the servo field 412 and the writer 406 is enabled and over the data field 408.

As the disc continues to rotate under the recording head 402, the writer 406 may transition out of the data field 408, at time t3, and may be disabled by the preamp (in some embodiments, the reader 404 and writer 406 may be enabled and disabled by a channel, controller, firmware, software, or other component). The reader 404 may remain enabled when the writer 406 is disabled and degaussed 410. At time t4, both the enabled reader 404 and disabled writer 406 can be over the servo field 412. The disc can continue to rotate (the reader 404 and writer 406 may be enabled simultaneously, regardless of the rotational direction of the disc), and at time t5, the writer 404 can be enabled as it is over the data field 414. In some embodiments, the reader may only be actively biased over read-only fields.

Figure 5:
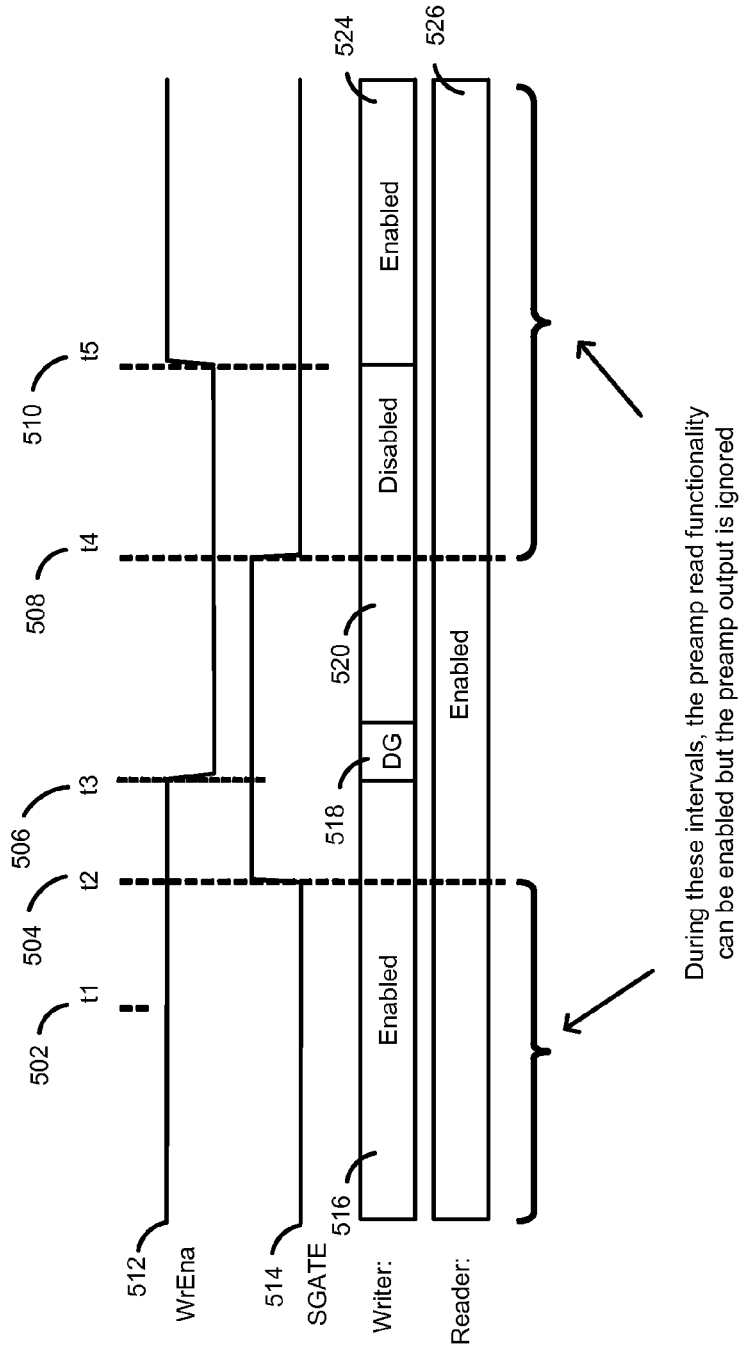
FIG. 5 is a diagram of reading read-only fields while writing, in accordance with certain embodiments of the present disclosure.

Referring to FIG. 5, a diagram of reading read-only fields while writing is shown and is generally designated 500. The timing diagram illustrated in FIG. 5 shows a write enable signal 512 (high=enable writer), an SGATE signal 514 (high=assert sgate), a preamp read and write status bar, and is marked at five points in time. In the embodiment of 500, the reader 526 is constantly enabled, although in other embodiments, the preamp read can be enabled or disabled at any point in time. Furthermore, the writer can be disabled when the reader is retrieving data from a data track so that the track isn't overwritten shortly after it is read.

At time t1 502, the SGATE 514 is not asserted, and the writer may be spatially above the data field, and the writer can be enabled 516. The reader may be enabled 526, but the reader output may be ignored. In some instances, the reader can have an operational life that may be shortened the longer the reader is active, and so it may desirable to enable the reader sparingly. In some embodiments, the reader may be enabled relatively close to the start of reading targeted data and may be disabled relatively close to stopping reading the data, which can be as soon as possible after reading the data is finished. At time t2 504, the reader may enter the servo field which can cause SGATE 514 to assert. The writer can still be enabled and may be emitting noise that can couple into the read signal, and if the level of the interference is greater than a threshold level, a filter can be enabled to reduce the noise on the read signal. The writer may exit the data field at time t3 506, whereupon WrEna 512 may drop to a logic low, triggering a degauss of the writer 518.

As time progresses, SGATE 514 can de-assert but both the reader and writer may be over the servo field at t4 508; the reader may remain enabled 526 and the writer may remain disabled 520. At time t5, the writer may transition out of the servo field and into the data field which may result in the enablement of the writer 524.

In the embodiments of 400 and 500, the writer can remain enabled until it exits the data field prior to the servo field, and may be enabled after it enters the data field after the servo field. The writer need not be enabled, however, simply because it is over a data field. A channel (or other entity such as a processor, software, controller, etc.) can enable the writer when data, such as system data or source data, is to be stored to the disc. For example, the writer may be enabled when source data (e.g. from a host, non-volatile solid state memory, volatile solid state memory, etc.) is to be stored; when no data is to be written, the writer can be disabled even though it may still be over the data field.

A characteristic of electronic systems can be that noise can couple on to data lines, corrupting the signal. Sources of noise, or interference, can come from other signals in the system, such as power signals, data signals, electromagnetic interference, and so forth. In systems where the reader and writer are enabled simultaneously, noise from the write signal can couple into the read signal. The interference can occur in the recording head, the preamp, traces and wires in the data storage device, and the trace gimbal assembly (TGA). The TGA, sometimes referred to as a Head Gimbal Assembly (HGA), comprises the transducer or slider, traces and suspension that attach to the arm used to position the read/write head at the desired location.

Filters (such as cancellation filters) may be employed to reduce to a threshold level the magnitude of the write signal coupled onto the read signal. Under normal operating conditions, the cancellation filter can reduce the interference in real time, that is, on the fly. In an embodiment, the cancellation filter can have a finite impulse response (FIR) filter, a summer, and an adaptive least mean square (LMS) filter. The write signal, which may come from the channel, can enter the FIR filter for processing. The LMS filter can program coefficients to the FIR filter so that when the output of the FIR filter is added to the noise on the incoming read signal, the cancellation filter can attenuate the interference below a threshold level.

In some embodiments, a system can provide a route for the read signal through the filter and another route bypassing the filter. The channel (or controller, host, etc.) can configure the detector to acquire the non-filtered read signal for further processing when the noise is below a threshold. In addition, the channel can use the filtered signal when the noise is sufficiently high to require filtering. Some systems may include two paths for the read signal, a first path that is not filtered and a second path that is filtered.

Figure 6:
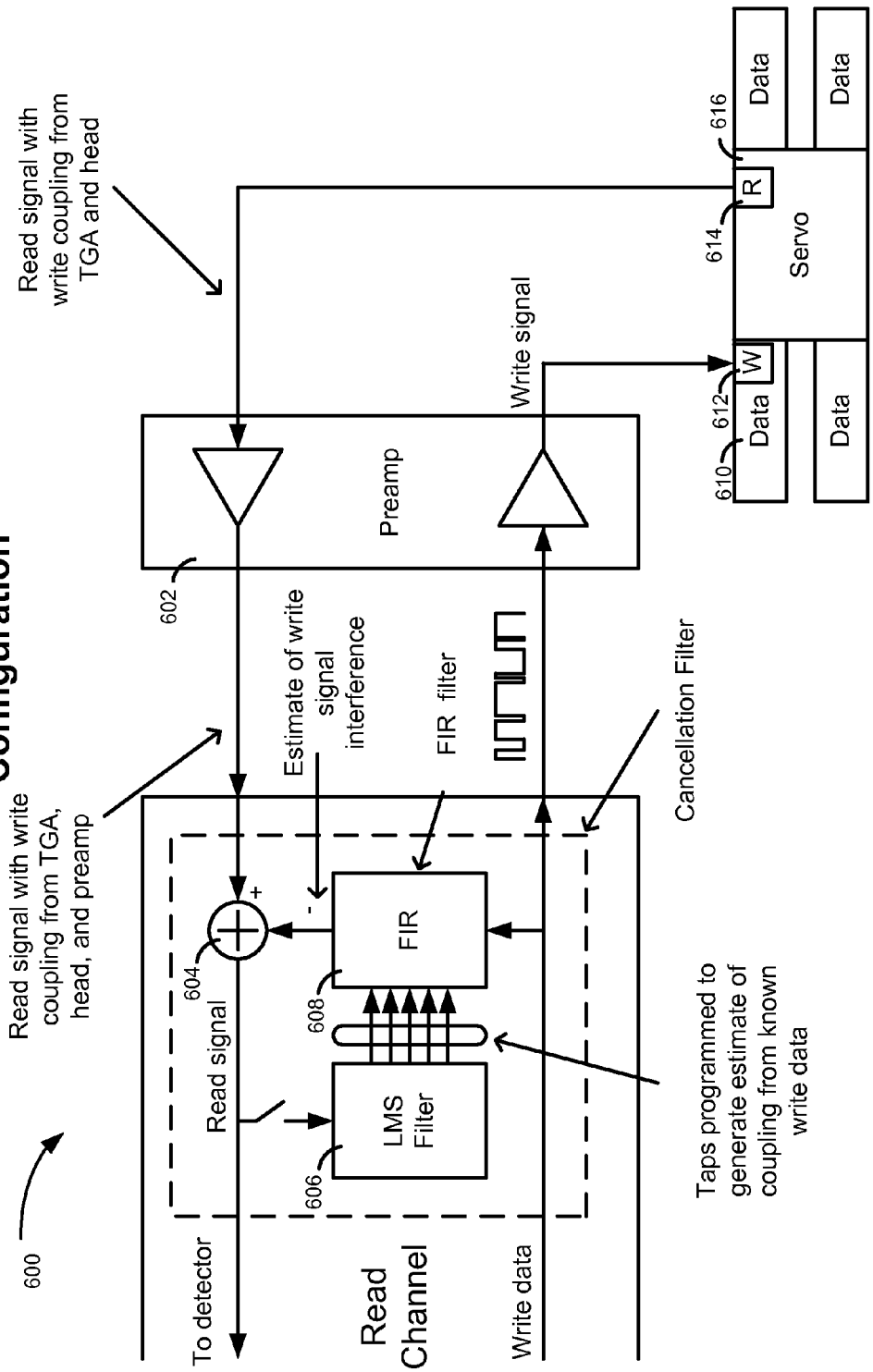
FIG. 6 is a diagram of reading read-only fields while writing, in accordance with certain embodiments of the present disclosure.

Referring to FIG. 6, a diagram of reading read-only fields while writing is shown and is generally designated 600. A reader 616 may be suspended over a servo sector 616 and a writer 612 can be suspended over a data field 610. Both the reader 612 and the writer 612 can be connected to a preamp 602. The read channel (which may comprise the R/W Channel 117 of system 100) can have an FIR filter 608, an LMS filter 606, and a summer 604.

When the read signal is outputted from the preamp 602, it can enter the summer 604, which may subtract an estimate of the interference signal determined by the FIR filter 608 from the read signal. Some interference may remain on the read signal, and an LMS filter 606 can set coefficients in the FIR filter 608 based on the remaining noise to correct errors in the interference estimate.

Figure 7:
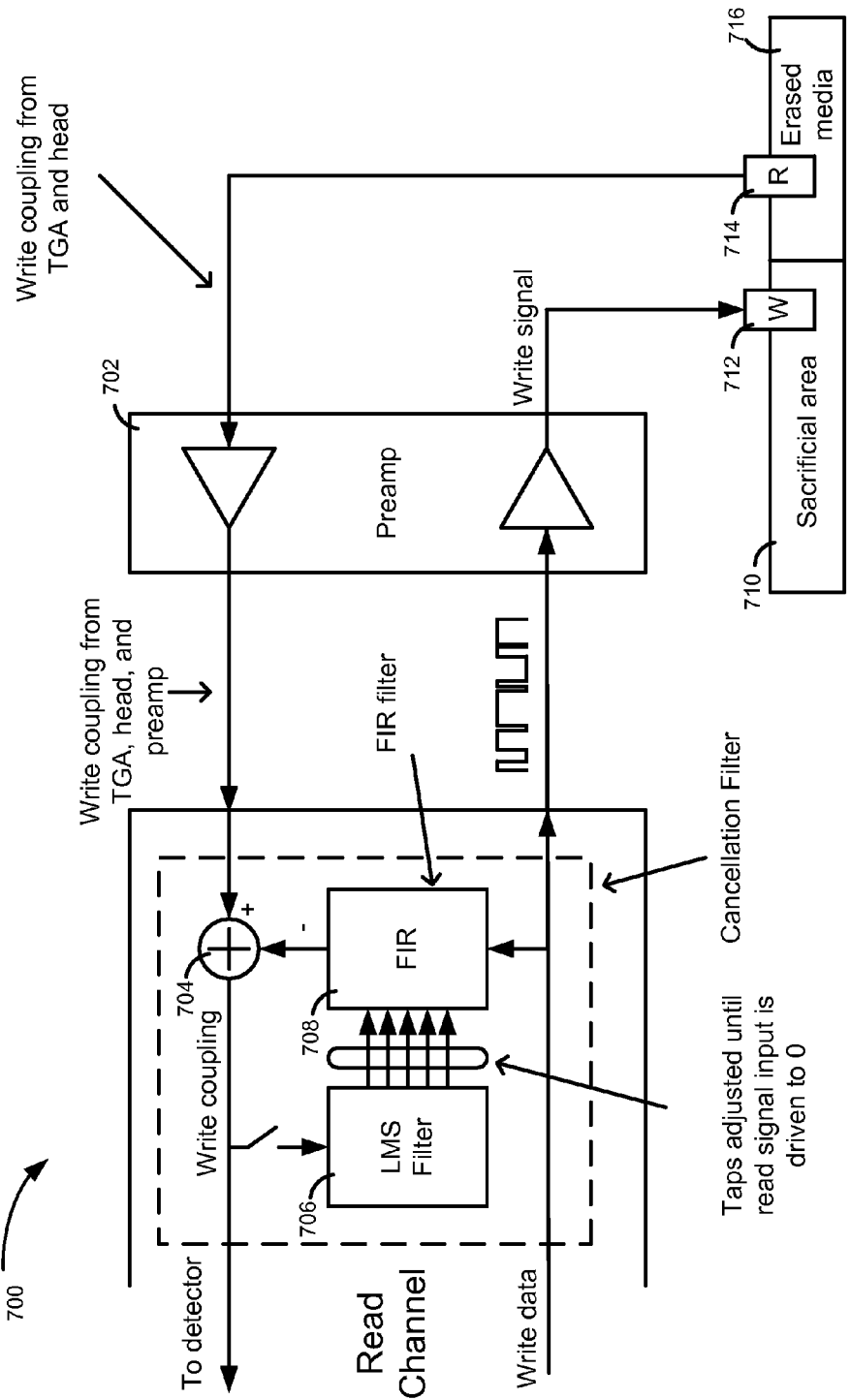
FIG. 7 is a diagram of reading read-only fields while writing, in accordance with certain embodiments of the present disclosure.

Referring to FIG. 7, a diagram of reading read-only fields while writing is shown and is generally designated 700. A cancellation filter may be calibrated prior to operational usage of the data storage device (DSD). In an embodiment, a channel can generate a data sequence, which may be random, pseudorandom, or a fixed pattern that a writer 712 can store to a portion of the disc media called a sacrificial area 710 while a reader 714 can simultaneously read data from an erased media 716 (e.g. media containing no data). In this particular embodiment, the sacrificial area 710 can be an alternating current erased media (AC field) and the erased media 716 can be a direct current erased media (DC field). In other embodiments, however, the sacrificial area 710 can be another media such as a DC field and the erased media 716 can be another media such as an AC field. The sacrificial area 710 can be used to store data upon completion of the calibration process.

The data sequence generated by the channel can be stored to the sacrificial area 710 by the writer 712. The reader 714 can read the erased media 716, which may not have data. Some of the write signal, which can contain the data sequence, may couple onto the read signal (via the preamp 702, the head, the trace gimbal assembly (TGA), etc.) where it can subtract a filtered write signal via a summer 704. An LMS filter 706 can adjust an FIR filter 708 so that the amount of the write signal (noise) coupled onto the read signal, which can be as a result of the subtraction operation at the summer 704, can be below a threshold level.

A system implementing a read servo while writing system, such as described herein, may receive user data from a source such as a host or non-volatile solid state memory. A channel (or other entity such as a processor, software, controller, etc.) can enable the writer when it is over a data field.

In some embodiments, the read element may be over a read-only sector, such as a servo sector, and the write element may be over a data sector. When both the reader and writer are simultaneously enabled, noise can couple onto a read data signal. The interference can be compared against a noise threshold, which can be set by a channel, controller, host, or at the point of manufacture, and if the interference exceeds the threshold level, a channel can enable a filter to reduce the noise. The data storage device (DSD) can then assert an Sgate, thus reading the information in the servo sector while the writer may still be enabled.

In some embodiments, the preamp can disable and degauss a write element when it exits a data field and the Sgate can be reasserted when the reader enters the servo field. As the disc rotates, the writer can exit the servo field and enter the data field, and can be enabled by the preamp.

Figure 8:
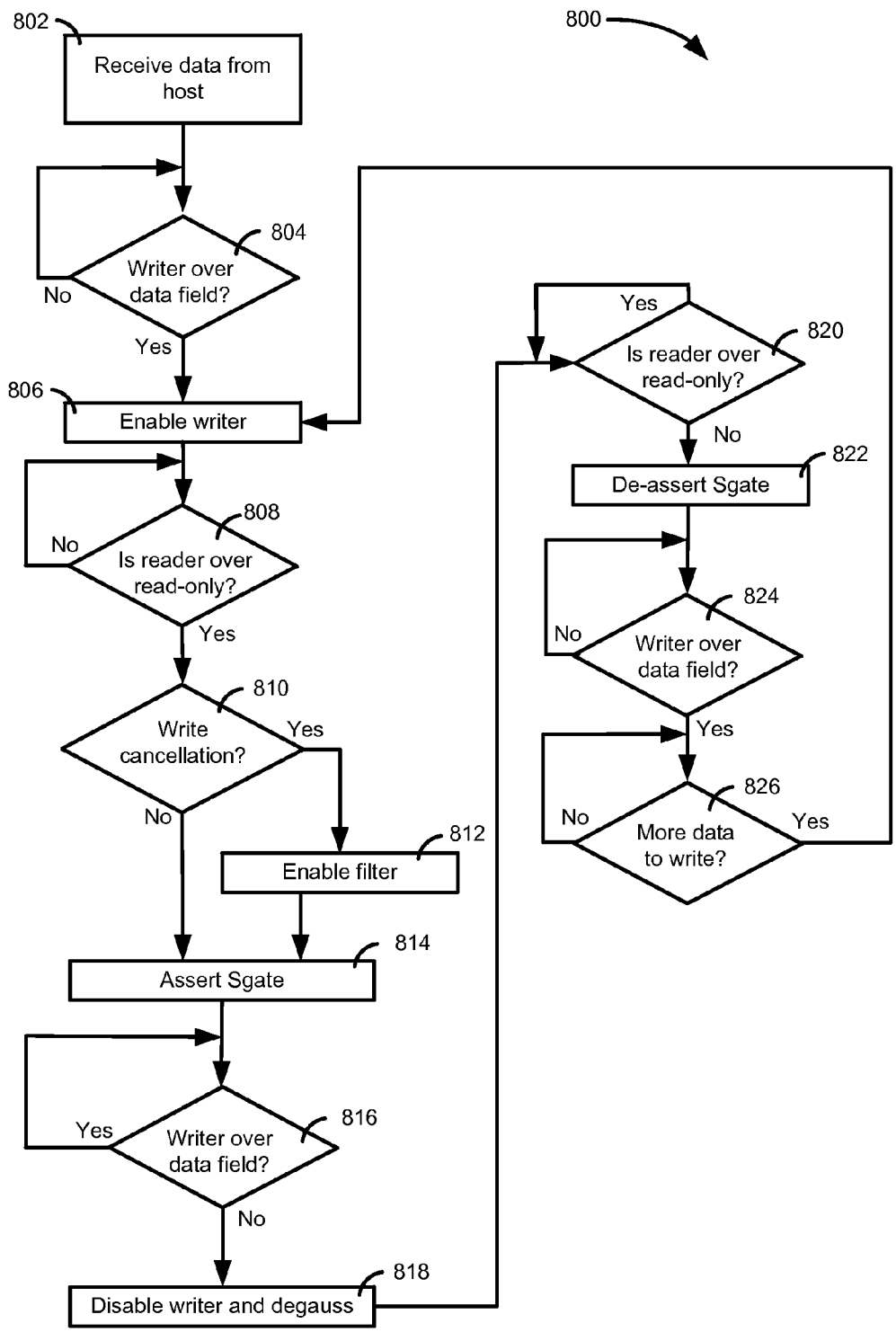
FIG. 8 is a flowchart of a method of reading read-only fields while writing, in accordance with certain embodiments of the present disclosure.

Referring to FIG. 8, a flowchart of a method of reading read-only fields while writing is shown and is generally designated 800. The data storage device (DSD) can receive data from a source, such as a host or memory, at 802. A controller (or channel, processor, software, etc.) may check to determine if the writer element is over a data field, at 804, and when the writer is over a data field, enable it at 806.

As the disc rotates, the reader may be positioned over the servo field and the writer over the data field, and both the reader and writer may be enabled. The channel can measure the amount of write interference, at 810, and can enable the cancellation filter when the noise is above a threshold level. Safety gates (Sgates) can be asserted at 814.

When the reader is positioned above the servo field, an Sgate can be asserted at 814, and the location of the writer with respect to the data field can be ascertained at 816. When the writer is not located in a data field, it can be disabled and degaussed at 818.

When it is determined that the reader has left the servo field, at 820, the sgate can be de-asserted at 822. The writer may still be located in the servo field even though the reader has exited, and the controller can determine the location of the writer, at 824. When the writer is over the data field, the preamp can enable the writer, at 806, when queued data is awaiting storage to the disc, at 826.

In the embodiment of 800, the reader can be constantly enabled, although in other embodiments, it can be toggled on and off. In some embodiments, the writer may be disabled when the reader is retrieving data from a data track.

In accordance with various embodiments, the methods described herein may be implemented as one or more software programs running on a computer processor or controller. In accordance with another embodiment, the methods described herein may be implemented as one or more software programs running on a computing device, such as a personal computer that is using a disc drive. Dedicated hardware implementations including, but not limited to, application specific integrated circuits, programmable logic arrays, and other hardware devices can likewise be constructed to implement the methods described herein. Further, the methods described herein may be implemented as a computer readable storage medium or device including instructions that when executed cause a processor to perform the methods.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. An apparatus comprising:
   a circuit including an adaptive least mean square (LMS) filter coupled to a finite impulse response (FIR) filter, the circuit configured to:
      receive a read signal via a read element of a transducer when the read element enters a read-only field;
      provide a write signal to a write element of the transducer when the write element is over a writable data field and the read element is in the read-only field;
      enable the FIR filter to determine an estimate of interference in the read signal, the estimate based on the write signal, during simultaneous operation of the write element and the read element;
      subtract the estimate of interference from the read signal to produce a filtered read signal;
      provide the filtered read signal to a detector when the noise of the read signal is above a threshold level;
      provide a non-filtered read signal when noise of the read signal is below the threshold level; and
      the adaptive LMS filter configured to program coefficients to the FIR filter based on noise remaining in the filtered read signal after subtraction of the estimate of interference, the program coefficients selected by the LMS filter to correct errors in the estimate of interference.

2. The apparatus of claim 1 comprising the circuit further configured to:
   disable the write element when the write element is not over the writable data field;
   degauss the write element when a write control signal disables the write element and the write element is not over the writable data field; and
   receive the read signal via the read element when the read element is over the read-only field.

3. The apparatus of claim 1 comprising the circuit further configured to:
   enable the read element when the read element is over a writable data field and the write element is enabled and over the writable data field; and
   ignore the read signal when the write element is enabled.

4. The apparatus of claim 1 comprising the circuit further configured to: disable the write element when the read element is over a read-only field and the write element is not over a writable data field.

5. The apparatus of claim 4 comprising the circuit further configured to: enable the write element when the read element is over a writable data field and the write element enters the writable data field.

6. The apparatus of claim 1 comprising the circuit further configured to: adjust the FIR filter while the read element is enabled.

7. An apparatus comprising:
   a circuit including:
      a first input to receive write data from a write element, the write data obtained when the write element is over a writable data field and a read element is producing a read signal from a write-disabled field;
      a cancellation filter circuit adapted to:
         acquire a non-filtered read signal when noise of the read signal is below a threshold level;
         acquire a filtered read signal when the noise of the read signal is above the threshold level;
      the cancellation filter including:
         a finite impulse response (FIR) filter configured to produce an estimate of interference based on the write data, and the filtered read signal is based on the estimate of interference;
         an adaptive least mean square (LMS) filter coupled to the FIR filter, the adaptive LMS filter configured to program coefficients to the FIR filter based on noise in the filtered read signal, the program coefficients selected by the LMS filter to correct errors in the estimate of interference.

8. The apparatus of claim 7 further comprising the circuit including:
   a controller adapted to disable the write element when the write element is not over a writable data field, and degauss the write element when a write control signal disables the write element.

9. The apparatus of claim 7 further comprising the circuit including:
a controller adapted to enable the read element when the read element is over a writable data field and the write element is enabled and over a writable data field, and ignore the read signal when the write element is enabled.

10. The apparatus of claim 7 further comprising the circuit including:
a controller adapted to disable the write element when the read element is over a write-disabled field, and enable the write element when the read element is over a writable data field and the write element enters the writable data field.

11. The apparatus of claim 7 further comprising the circuit including:
a controller adapted to:
receive a read signal via the read element when the read element enters the write-disabled field and the write element is writing data in the writable data field;
enable the cancellation filter to filter noise of the read signal to produce a filtered read signal; and
provide the filtered read signal to a detector.

12. The apparatus of claim 11 further comprising:
a preamp;
a read channel; and
a transducer having the read element and the write element with a space between.

13. The apparatus of claim 12 further comprising the read channel including:
the detector configured to receive the read signal; and
the cancellation filter.

14. A method comprising:
writing data via a write element when the write element is over a writable data field while a read element is generating a read signal by reading from a read-only field;
estimating interference based on the write data;
acquiring a non-filtered read signal when noise of the read signal is below a threshold level;
acquiring a filtered read signal, based on the estimate of interference, when the noise of the read signal is above the threshold level; and
programming coefficients via an adaptive least mean square (LMS) filter to a finite impulse response (FIR) filter based on noise in the filtered read signal, the program coefficients selected by the LMS filter to correct errors in the estimate of interference.

15. The method of claim 14 further comprising:
enabling a cancellation filter to filter noise of a read signal received during the simultaneous operation of the write element and the read element to produce the filtered read signal, the cancellation filter including the LMS filter and the FIR filter;
providing the filtered read signal to a detector;
determining if the noise of the read signal is below the threshold; and
configuring the detector to acquire a non-filtered read signal when the noise of the read signal is below the threshold level and to acquire the filtered read signal when the noise of the read signal is above the threshold level.

16. The method of claim 15 further comprising:
asserting safety gates when the read element enters a read-only field;
disabling and degaussing the write element when the write element exits a writable data field; and
deasserting the safety gates when the reader element exits the read-only field.

17. The method of claim 16 further comprising:
disabling the write element when the read element is retrieving data from a media.

* * * * *